US011265765B2

(12) United States Patent
Chin et al.

(10) Patent No.: US 11,265,765 B2
(45) Date of Patent: Mar. 1, 2022

(54) REDIRECTION OR HANDOVER FOR MULTICAST BROADCAST MULTIMEDIA SERVICE

(71) Applicant: QUALCOMM Incorporated, San Diego, CA (US)

(72) Inventors: Tom Chin, San Diego, CA (US); Ajith Tom Payyappilly, San Diego, CA (US); Kuo-Chun Lee, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 16/790,311

(22) Filed: Feb. 13, 2020

(65) Prior Publication Data

US 2020/0351720 A1 Nov. 5, 2020

Related U.S. Application Data

(60) Provisional application No. 62/842,947, filed on May 3, 2019.

(51) Int. Cl.
*H04W 36/00* (2009.01)
*H04W 36/08* (2009.01)
(Continued)

(52) U.S. Cl.
CPC ......... *H04W 36/0007* (2018.08); *H04W 4/06* (2013.01); *H04W 36/0022* (2013.01);
(Continued)

(58) Field of Classification Search
None
See application file for complete search history.

(56) References Cited

U.S. PATENT DOCUMENTS

2013/0215813 A1* 8/2013 Kotecha ............... H04L 1/0017
370/312
2013/0258934 A1* 10/2013 Amerga ............... H04W 4/06
370/312

(Continued)

OTHER PUBLICATIONS

International Search Report and Written Opinion—PCT/US2020/019467—ISAEPO—dated May 28, 2020.

(Continued)

*Primary Examiner* — Kenny S Lin
(74) *Attorney, Agent, or Firm* — Harrity & Harrity, LLP (57) ABSTRACT

Various aspects of the present disclosure generally relate to wireless communication. In some aspects, a broadcast multicast service center (BMSC) device may receive, from a user equipment (UE) and via a first base station associated with a first radio access technology (RAT), a request for evolved multicast broadcast multimedia service (eMBMS) content. The BMSC device may transmit, to an access and mobility management function (AMF) device, a redirection request or a handover request, associated with the UE, from the first base station to a second base station associated with a second RAT. The BMSC device may transmit, to the UE and based at least in part on the UE being redirected or handed over to the second base station, the eMBMS content via the second base station. Numerous other aspects are provided.

30 Claims, 6 Drawing Sheets

(51) Int. Cl.
*H04W 4/06* (2009.01)
*H04W 36/38* (2009.01)
*H04W 88/18* (2009.01)
*H04W 88/06* (2009.01)

(52) U.S. Cl.
CPC ......... *H04W 36/08* (2013.01); *H04W 36/385* (2013.01); *H04W 88/06* (2013.01); *H04W 88/18* (2013.01)

(56) References Cited

U.S. PATENT DOCUMENTS

| | | | |
|---|---|---|---|
| 2013/0294321 A1 | 11/2013 | Wang et al. | |
| 2014/0095668 A1* | 4/2014 | Oyman | H04L 1/1893 709/219 |
| 2014/0119265 A1* | 5/2014 | Shauh | H04W 4/06 370/312 |
| 2015/0270979 A1* | 9/2015 | Andrada | H04L 51/38 370/390 |
| 2017/0013421 A1* | 1/2017 | Kodaypak | H04W 72/005 |
| 2017/0374581 A1* | 12/2017 | Dao | H04W 76/40 |
| 2018/0242230 A1* | 8/2018 | Grinshpun | H04L 65/1016 |
| 2019/0254094 A1* | 8/2019 | Babu | H04W 76/15 |
| 2020/0053617 A1* | 2/2020 | Park | H04W 48/18 |
| 2020/0077161 A1* | 3/2020 | Loh | H04L 65/602 |
| 2020/0389822 A1* | 12/2020 | Liu | H04W 36/0022 |

OTHER PUBLICATIONS

Qualcomm Incorporated: "Clarify GUTI Aspects for Single-Registration Mode UEs for Interworking Without N26", 3GPP Draft, 3GPP TSG-SA2 Meeting #127bis 23502_CR0404R1_5GS_PH1_(REL-15)_S2-185876_WAS_S2-184818_23502_ClarifyGUTI Aspects for Single-Registration Mode UEs for Interworking Without N26_V1. 3rd Generation Partnership Project (3GPP), vol. SA WG2, No. Newport Beach, United States, May 28, 2018-Jun. 1, 2018, Jun. 10, 2018 (Jun. 10, 2018), XP051459078, 6 pages, Retrieved from the Internet: URL: http://www.3gpp.org/ftp/Meetings%5F3GPP%5FSYNC/SA/Docs, [retrieved on Jun. 10, 2018], p. 1.

Samsung: "Data Forwarding for Inter-System Inter-RAT Handover from 5GS to EPS", 3GPP Draft, 3GPP TSG-RAN WG3 Meeting #97, R3-172974 Data Forwarding for Inter-System Handover, 3rd Generation Partnership Project (3GPP), Mobile Competence Centre, 650, Route Des Lucioles, F-06921 Sophia-Antipolis Cedex, France, vol. RAN WG3, No. Berlin, Germany, Aug. 21, 2017-Aug. 25, 2017, Aug. 21, 2017 (Aug. 21, 2017), XP051319814, 6 pages, Retrieved from the Internet: URL: http://www.3gpp.org/ftp/Meetings_3GPP_SYNC/RAN3/Docs/, [retrieved on Aug. 21, 2017], Figure 1.

* cited by examiner

REDIRECTION OR HANDOVER FOR MULTICAST BROADCAST MULTIMEDIA SERVICE

CROSS-REFERENCE TO RELATED APPLICATIONS

This application claims priority to Provisional Patent Application No. 62/842,947, filed on May 3, 2019, entitled "REDIRECTION OR HANDOVER FOR MULTICAST BROADCAST MULTIMEDIA SERVICE," which is hereby expressly incorporated by reference herein.

FIELD OF THE DISCLOSURE

Aspects of the present disclosure generally relate to wireless communication and to techniques and apparatuses for redirection or handover for evolved multicast broadcast multimedia service (eMBMS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE) device, may include transmitting, to a broadcast multicast service center (BMSC) and via a first base station associated with a first radio access technology (RAT), a request for evolved multicast broadcast multimedia service (eMBMS) content; receiving, based at least in part on transmitting the request for the eMBMS content, a request to communicatively connect with a second base station associated with a second RAT; communicatively connecting with the second base station based at least in part on receiving the request to communicatively connect with the second base station; and receiving the eMBMS content via the second base station.

In some aspects, a UE for wireless communication may include a memory and one or more processors coupled to the memory. The memory and the one or more processors may be configured to transmit, to a BMSC and via a first base station associated with a first RAT, a request for eMBMS content; receive, based at least in part on transmitting the request for the eMBMS content, a request to communicatively connect with a second base station associated with a second RAT; communicatively connect with the second base station based at least in part on receiving the request to communicatively connect with the second base station; and receive the eMBMS content via the second base station.

In some aspects, a non-transitory computer-readable medium may store one or more instructions for wireless communication. The one or more instructions, when executed by one or more processors of a UE device, may cause the one or more processors to: transmit, to a BMSC and via a first base station associated with a first RAT, a request for eMBMS content; receive, based at least in part on transmitting the request for the eMBMS content, a request to communicatively connect with a second base station associated with a second RAT; communicatively connect with the second base station based at least in part on receiving the request to communicatively connect with the second base station; and receive the eMBMS content via the second base station.

In some aspects, an apparatus for wireless communication may include means for transmitting, to a BMSC and via a first base station associated with a first RAT, a request for eMBMS content; means for receiving, based at least in part on transmitting the request for the eMBMS content, a request to communicatively connect with a second base station associated with a second RAT; means for communicatively connecting with the second base station based at least in part on receiving the request to communicatively connect with the second base station; and means for receiving the eMBMS content via the second base station.

In some aspects, a method of wireless communication, performed by a BMSC device, may include receiving, from a UE and via a first base station associated with a first RAT, a request for eMBMS content; transmitting, to an access and mobility management function (AMF) device, a redirection request or a handover request, associated with the UE, from the first base station to a second base station associated with a second RAT; and transmitting, to the UE and based at least in part on the UE being redirected or handed over to the second base station, the eMBMS content via the second base station.

In some aspects, a BMSC device for wireless communication may include a memory and one or more processors coupled to the memory. The memory and the one or more processors may be configured to receive, from a UE and via a first base station associated with a first RAT, a request for eMBMS content; transmit, to an AMF device, a redirection request or a handover request, associated with the UE, from the first base station to a second base station associated with a second RAT; and transmit, to the UE and based at least in part on the UE being redirected or handed over to the second base station, the eMBMS content via the second base station.

In some aspects, a non-transitory computer-readable medium may store one or more instructions for wireless communication. The one or more instructions, when executed by one or more processors of a BMSC device, may cause the one or more processors to: receive, from a UE and via a first base station associated with a first RAT, a request for eMBMS content; transmit, to an AMF device, a redirection request or a handover request, associated with the UE, from the first base station to a second base station associated with a second RAT; and transmit, to the UE and based at least in part on the UE being redirected or handed over to the second base station, the eMBMS content via the second base station.

In some aspects, an apparatus for wireless communication may include means for receiving, from a UE and via a first base station associated with a first RAT, a request for eMBMS content; means for transmitting, to an AMF device, a redirection request or a handover request, associated with the UE, from the first base station to a second base station associated with a second RAT; and means for transmitting, to the UE and based at least in part on the UE being redirected or handed over to the second base station, the eMBMS content via the second base station.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
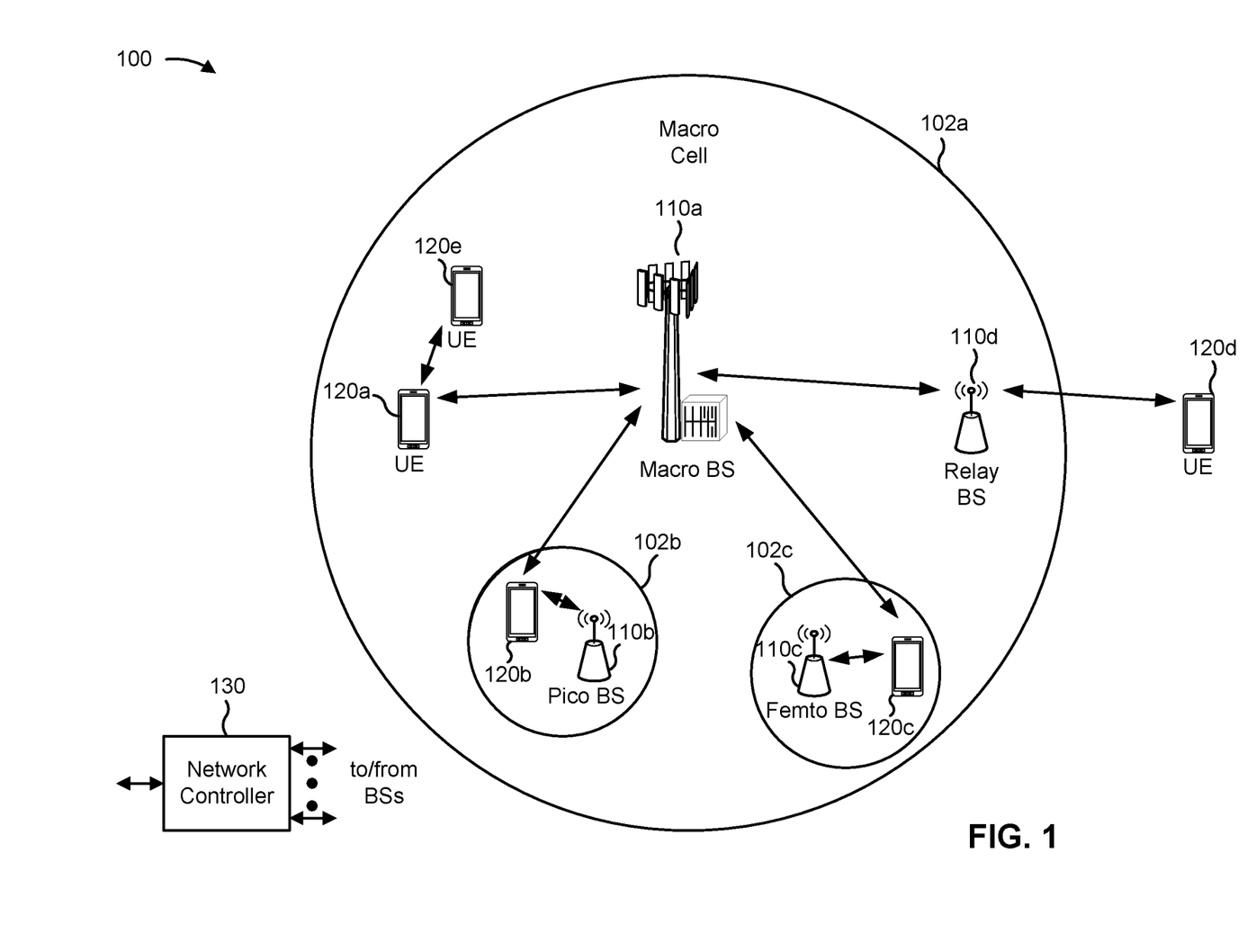
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, wireless network 100 may include one or more network controllers 130. For example, wireless network 100 may include a network controller 130 that implements an access and mobility management function (AMF) device, a network controller 130 that implements a broadcast multicast service center (BMSC) device, and/or the like. In some aspects, the AMF device may be included in a core network of wireless network 100 (e.g., a 5G/NR core network). In some aspects, the BMSC device may communicate with devices included in one or more core networks (e.g., a 5G/NR core network, an LTE core network, and/or the like) to provide evolved multicast broadcast multimedia service (eMBMS) content (e.g., over-the-air television, video streaming, music streaming, and/or the like) to UEs 120 included in wireless network 100.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks, LTE RAT networks, and/or other types of RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
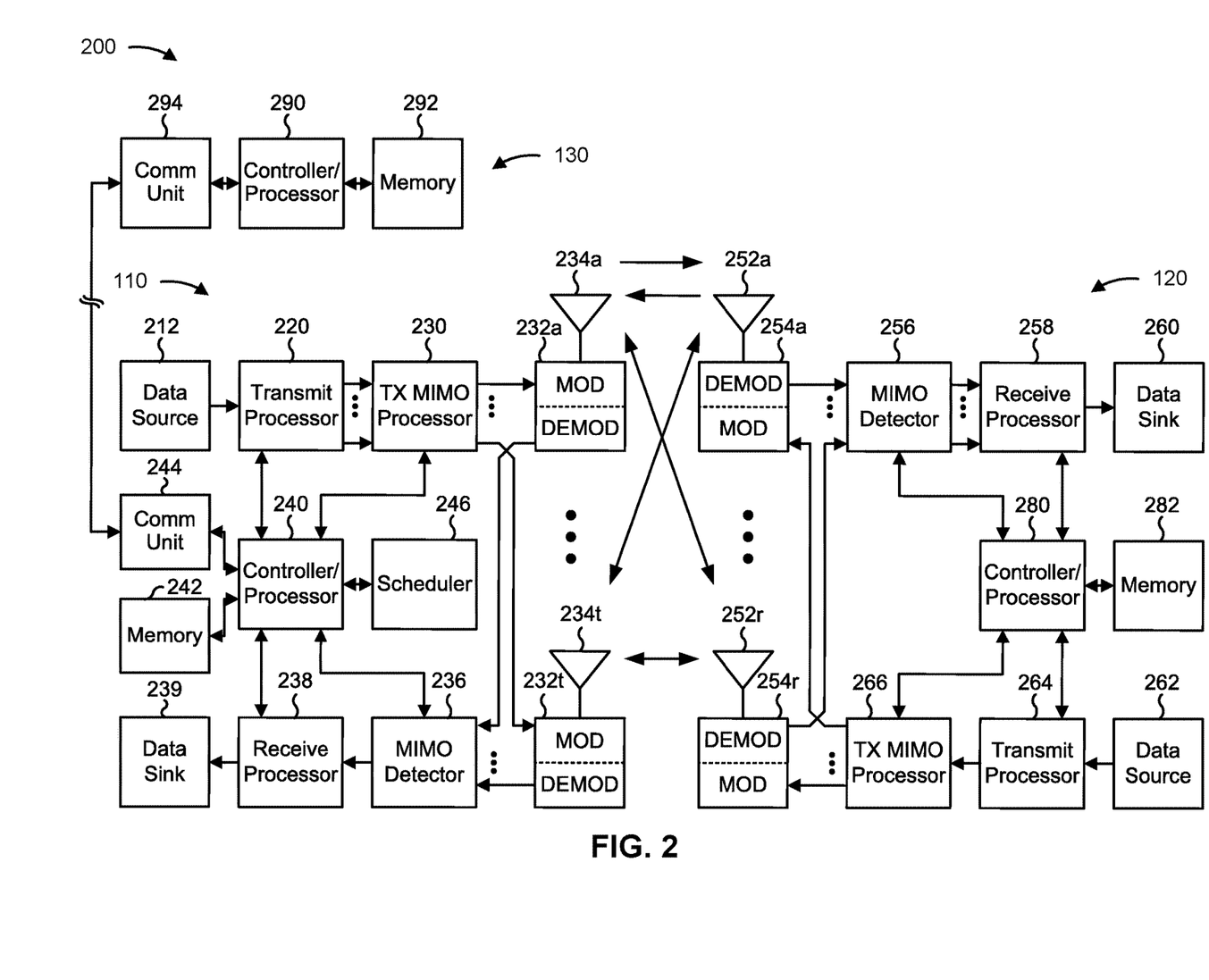
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, and/or any other component(s) of FIG. 2 may perform one or more techniques associated with redirection or handover for evolved multicast broadcast multimedia service (eMBMS), as described in more detail elsewhere herein. For example, controller/processor 240 of base station 110, controller/processor 280 of UE 120, controller/processor 290 of network controller 130, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting, to a BMSC and via a first base station 110 associated with a first RAT, a request for eMBMS content; means for receiving, based at least in part on transmitting the request for the eMBMS content, a request to communicatively connect with a second base station 110 associated with a second RAT; means for communicatively connecting with the second base station 110 based at least in part on receiving the request to communicatively connect with the second base station 110; means for receiving the eMBMS content via the second base station 110, and/or the like. In some aspects, such means may include one or more components of UE 120 described in connection with FIG. 2.

In some aspects, network controller 130 may include means for receiving, from a UE 120 and via a first base station 110 associated with a first RAT, a request for eMBMS content; means for transmitting, to an AMF device, a redirection request or handover request, associated with the UE 120, from the first base station 110 to a second base station 110 associated with a second RAT; means for transmitting, to the UE 120 and based at least in part on the UE 120 being redirected or handed over to the second base station 110, the eMBMS content via the second base station 110, and/or the like. In some aspects, such means may include one or more components of network controller 130 described in connection with FIG. 2.

As indicated above, FIG. 2 is provided as an example. Other examples may differ from what is described with regard to FIG. 2.

A base station that operates using an LTE RAT may transmit eMBMS content to a plurality of UEs by broadcasting (e.g., on a physical broadcast channel (PBCH)) and/or multicasting (e.g., on a physical multicast channel (PMCH)) the eMBMS content to the plurality of UEs. In addition, a base station that operates using an LTE RAT may transmit eMBMS content to individual UEs by unicasting the eMBMS content (e.g., on a physical downlink shared channel (PDSCH)).

LTE provides a mechanism for transitioning between unicasting eMBMS content to a UE via an LTE base station and broadcasting or multicasting eMBMS content to the UE via an LTE base station (e.g., the same LTE base station or another LTE base station), which may be referred to as eMBMS operation on demand (MooD).

In some cases, 5G/NR may not support broadcasting or multicasting eMBMS content (or other types of MBMS content). Thus, base stations that operate using a 5G/NR RAT may be limited to unicasting eMBMS content to UEs. As a result, a 5G/NR base station may be required to transmit individual data streams of the same eMBMS content to UEs communicatively connected with the base station, which is an inefficient means (e.g., a means that results in wasted radio resources) for providing the same eMBMS content to a plurality of UEs. As the quantity of deployed 5G/NR base stations increases, and as the quantity of UEs that are capable of operating using 5G/NR frequencies increases, the resource usage due to unicasting eMBMS content over 5G/NR may exponentially increase. However, there may be no mechanism available in 5G/NR for transitioning between unicasting eMBMS and broadcasting or multicasting eMBMS.

Some aspects described herein provide techniques and apparatuses for redirection or handover for eMBMS. In some aspects, a BMSC device may receive, via a base station that operates using a 5G/NR RAT (e.g., a 5G/NR base station), a request for eMBMS content from a UE. Additionally or alternatively to unicasting the eMBMS content to the UE via the 5G/NR base station, the BMSC device may initiate a redirection or handover over of the UE to a base station that operates using an LTE RAT (e.g., an LTE base station) by transmitting a redirection or handover request to an AMF device associated with the 5G/NR base station. The AMF device may transmit, to the 5G/NR base station, a redirection request or a handover request for the UE. The 5G/NR base station may transmit a redirection command (e.g., based at least in part on receiving a redirection request) or a handover command (e.g., based at least in part on receiving a handover command) to the UE. In this way, the UE may communicatively connect with the LTE base station to receive the eMBMS content via broadcast or multicast, which conserves radio resources that would have otherwise been consumed on unicasting the eMBMS content to the UE (and to a plurality of other UEs) via the 5G/NR base station.

Figure 3A:
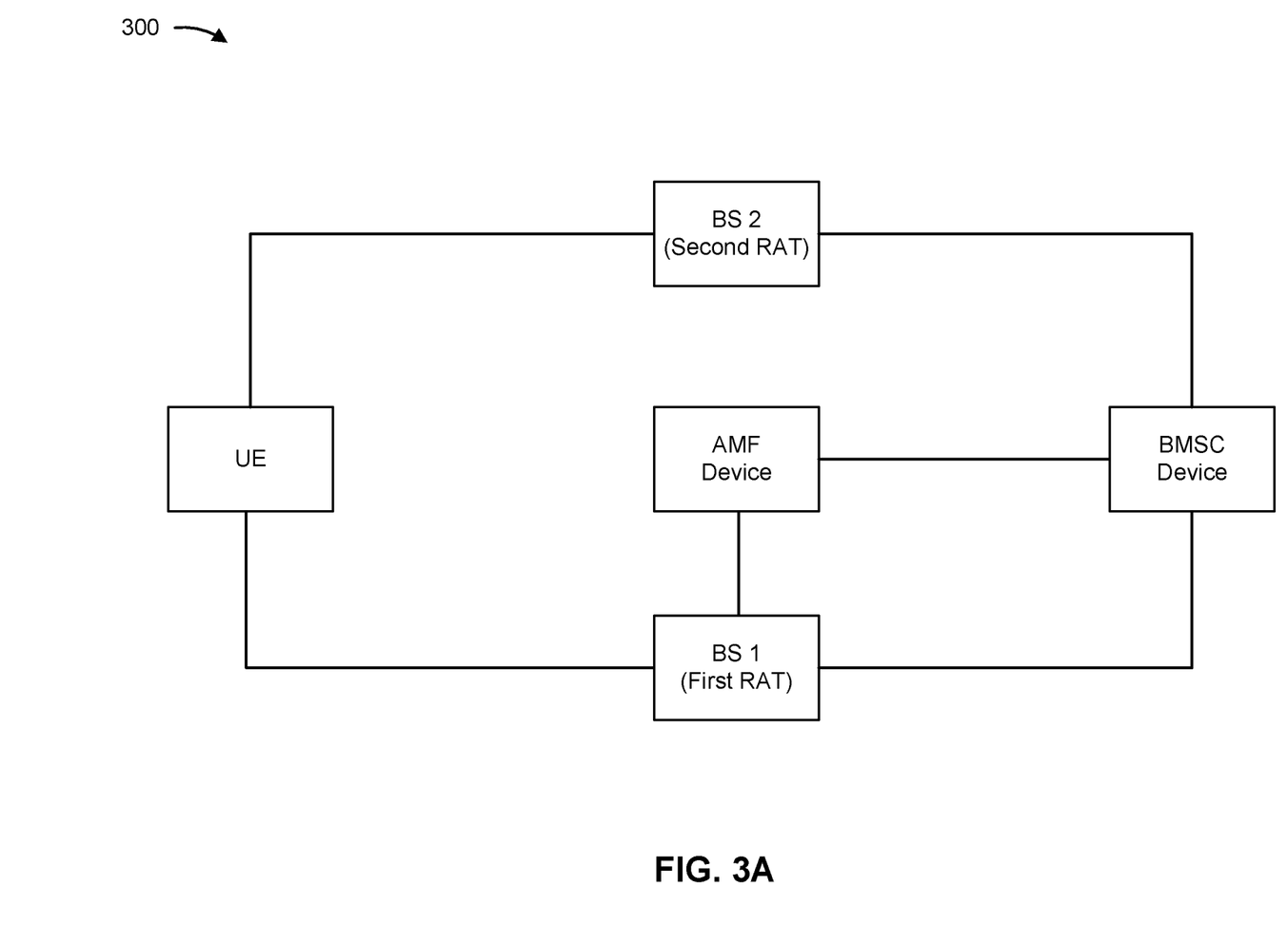
FIGS. 3A and 3B are diagrams illustrating one or more examples of redirection or handover for evolved multicast broadcast multimedia service (eMBMS), in accordance with various aspects of the present disclosure.
Figure 3B:
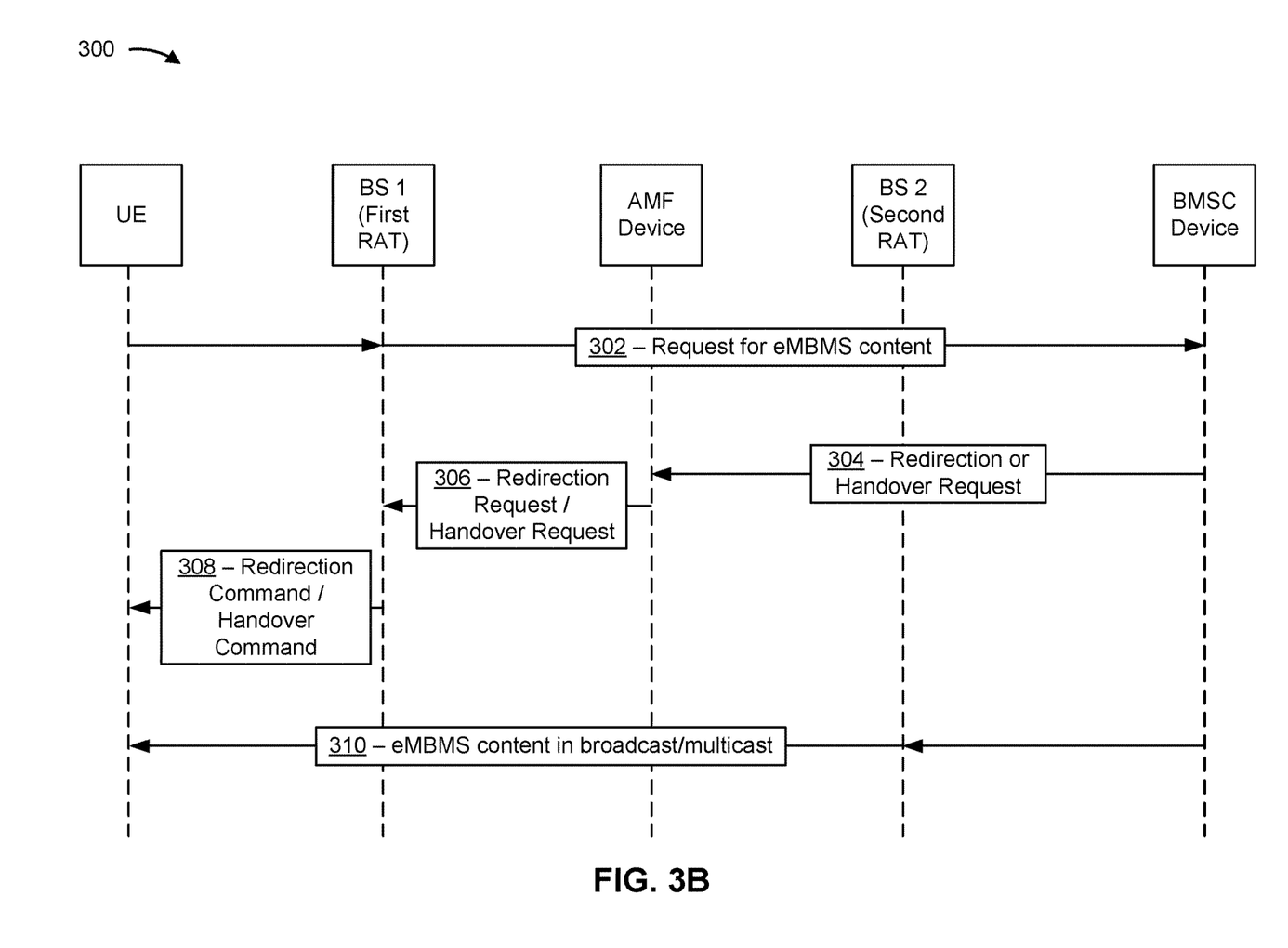

FIGS. 3A and 3B are diagrams illustrating one or more examples 300 of redirection or handover for eMBMS, in accordance with various aspects of the present disclosure. As shown in FIGS. 3A and 3B, examples 300 may include one or more devices, such as a UE (e.g., UE 120), a plurality of base stations such as BS 1 and BS 2 (e.g., BS 110), an AMF device (e.g., network controller 130), a BMSC device (e.g., network controller 130), and/or the like. In some aspects, examples 300 may include different quantities and/or configurations of the devices illustrated in FIGS. 3A and 3B.

The AMF device may be included in a core network of a wireless network (e.g., wireless network 100), such as a 5G/NR core network (e.g., a next generation (NG) Core). The AMF device may manage authentication, activation, deactivation, and/or mobility functions associated with the UE. The AMF device may facilitate the selection of a gateway (e.g., a serving gateway, a packet data network gateway, a user plane function (UPF) device, and/or the like) to serve traffic to and/or from the UE. In some aspects, the AMF device may perform operations associated with handing over the UE from a first base station (e.g., BS 1) to a second base station (e.g., BS 2). In some aspects, the AMF device may perform operations associated with redirecting the UE from a first frequency to a second frequency. In this case, the AMF device may provide an indication of the second frequency and/or a cell operating using the second frequency, and the UE may release from a cell that is operating using the first frequency to communicatively connect (e.g., redirect) to the second cell and second frequency.

The base stations may be included in one or more radio access networks (RANs) in the wireless network. In some aspects, the base stations may operate using respective RATs. For example, BS 1 may operate using a first RAT and BS 2 may operate using a second RAT. In some aspects, the first RAT and the second RAT may be different types of RATs (e.g., the first RAT may be an LTE RAT and the second RAT may be a 5G/NR RAT). In some aspects, the first RAT and the second RAT may be a same type of RAT (e.g., a 5G/NR RAT). In some aspects, BS 1 and BS 2 may be implemented by the same base station, which may operate using a plurality of different types of RATs. In this case, the base station may provide one or more first cells in which the base station operates using the first RAT (e.g., the LTE RAT), and may provide one or more second cells in which the base station operates using the second RAT (e.g., the 5G/NR RAT).

The BMSC device may store eMBMS content from one or more content providers, and may provide the eMBMS content to the UE via the wireless network. In some aspects, the BMSC device may store and/or provide other types of content, such as 3G MBMS content, 5G/NR MBMS content (or gMBMS content), and/or the like. In some aspects, the BMSC device may provide eMBMS content to the UE via one or more core networks and/or one or more RANs included in the wireless network. For example, the BMSC device may provide eMBMS content to the UE via BS 1 (e.g., via an LTE core network, which may also be referred to as an evolved packet core (EPC)), via BS 2 (e.g., via the NG Core), and/or the like.

As indicated above, in some cases, the BMSC device may be capable of broadcasting and/or multicasting eMBMS content via particular types of RATs and/or core networks, and may be capable of only unicasting eMBMS content via other types of RATs and/or core networks. As an example, the BMSC device may be capable of only unicasting eMBMS content via the first RAT and corresponding core network, and may be capable of broadcasting and/or multicasting eMBMS content via the second RAT and corresponding core network. Accordingly, if the BMSC device receives a request for eMBMS content from a UE that is communicatively connected to BS 1 using the first RAT, the BMSC device may instruct the AMF device to hand over or redirect the UE to BS 2 so that the BMSC device can broadcast or multicast the eMBMS content to the UE via BS 2 using the second RAT.

As shown in FIG. 3B, and by reference number 302, the UE may transmit the request for the eMBMS content to the BMSC device. In some aspects, the UE may transmit the request to the BMSC device via BS 1 using the first RAT associated with BS 1. BS 1 may forward the request to the BMSC device via one or more devices included in a first core network (e.g., an NG Core) included in the wireless network (e.g., a UPF device and/or the like).

In some aspects, the request may include a hypertext transfer protocol (HTTP) Get command and/or another type of request for eMBMS content. In some aspects, the UE may transmit the request via an application programming interface (API) such as a representational state transfer (REST) API and/or another type of API.

The request may include information identifying the eMBMS content (e.g., an indication of a temporary mobile group identity (TMGI) associated with the eMBMS content or another type of identifier associated with the eMBMS content), may include information identifying the UE (e.g., an indication of a 5G/NR globally unique temporary identifier (GUTI) associated with the UE and/or another type of identifier associated with the UE), and/or the like.

As further shown in FIG. 3B, and by reference number 304, the BMSC device may receive the request and may transmit a redirection or handover request to the AMF device included in the first core network (e.g., the NG Core) based at least in part on receiving the request for the eMBMS content from the UE. The BMSC device may provide the redirection or handover request to the AMF device via an interface between the BMSC device and the AMF device. In some aspects, the BMSC device may initially unicast the eMBMS content to the UE via BS 1 (e.g., and thus, via the first RAT), a UPF device, and/or the like, while the handover or redirection of the UE is being processed. In some aspects, another device included in the core network may transmit the redirection or handover request to the AMF device, such as a UPF device, a session management function (SMF) device, a policy control function (PCF) device, and/or the like.

The redirection or handover request may include an indication of the identifier associated with the UE (e.g., the 5G/NR GUTI and/or another type of identifier) such that the AMF device can instruct BS 1 to hand over or redirect the UE to BS 2. The redirection or handover request may further include an indication of one or more frequencies, of the second RAT (e.g., one or more LTE frequencies, one or more 5G/NR frequencies, and/or the like), associated with the eMBMS content (e.g., one or more frequencies on which the eMBMS content is permitted and/or capable of being transmitted using the second RAT). In some aspects, the BMSC device may identify the one or more frequencies based at least in part on the identifier associated with the eMBMS content (e.g., the TMGI and/or another type of identifier) indicated in the request received from the UE. For example, the BMSC device may identify the eMBMS content, stored by the BMSC device, based at least in part on the identifier associated with the eMBMS content, and may identify an association between the eMBMS content and the one or more frequencies (e.g., stored in a data store associated with the BMSC device, such as a table, an electronic file, an electronic file system, a memory device, a storage device, a database, metadata, and/or the like).

As further shown in FIG. 3B, and by reference number 306, the AMF device may receive the redirection or handover request from the BMSC device and may transmit, to BS 1, a redirection request (e.g., to redirect the UE to BS 2) or a handover request (e.g., to hand over the UE to BS 2). In some aspects, the AMF device may determine whether to transmit a redirection request or a handover request based at least in part on whether an interface (e.g., an X2 interface, an S1 interface, an Xn interface, and/or the like) is available between BS 1 and BS 2. For example, if an interface is available between BS 1 and BS 2, the AMF device may transmit a handover request (e.g., because BS 1 and BS 2 may be capable of coordinating a handover of the UE using the interface). As another example, if no interface is available, the AMF device may transmit a redirection request such that the UE releases the connection with BS 1 and initiates the establishment of a connection with BS 2.

In some aspects, the redirection request or the handover request may include an indication of the identifier associated with the UE (e.g., the 5G/NR GUTI and/or another type of identifier) such that BS 1 may transmit a redirection command or handover command to the UE. In some aspects, the redirection request or the handover request may include an indication of the one or more frequencies associated with the eMBMS content and/or an indication of BS 2 (e.g., a cell identifier associated with BS 2 and/or another type of identifier).

As further shown in FIG. 3B, and by reference number 308, BS 1 may transmit, to the UE, a request to communicatively connect with BS 2. The request may include a redirection command (e.g., if BS 1 receives a redirection request from the AMF device) or a handover command (e.g., if BS 1 receives a handover request from the AMF device.

In some aspects, if BS 1 transmits a redirection command to the UE, the redirection command may include a radio resource control (RRC) connection release with the redirection command. The redirection command may include information identifying the one or more frequencies associated with the eMBMS such that the UE may search for a cell (e.g., such as a cell provided by BS 2) that is capable of operating using a frequency of the one or more frequencies.

In some aspects, if BS 1 transmits a handover command to the UE, the redirection command may include a Mobility from NR command or another type of handover command. The handover command may include information identifying the cell associated with BS 2 (e.g., a cell that is capable of operating using a frequency of the one or more frequencies associated with the eMBMS) such that the UE may communicatively connect with BS 2.

Moreover, BS 1 may coordinate the handover with BS 2 via the interface between BS 1 and BS 2. For example, BS 1 may initiate the handover by transmitting a next generation application protocol (NGAP) handover required communication to BS 2. BS 1 may transmit the NGAP handover required communication via the AMF device associated with BS 1 and a mobility management entity (MME) device associated with BS 2. BS 2 may acknowledge the NGAP handover required communication by transmitting an S1 application protocol (S1AP) handover request acknowledgement communication to BS 1. For example, BS 2 may transmit the S1AP handover request acknowledgement communication via the MME device associated with BS 2 and the AMF device associated with BS 1.

The UE may communicatively connect with BS 2 based at least in part on receiving the request to communicatively connect with BS 2 (e.g., the redirection command or the handover command). For example, the UE may initiate a random access channel (RACH) procedure to synchronize a wireless communication link (e.g., an uplink and a downlink) with BS 2 based at least in part on receiving the request to communicatively connect with BS 2.

As further shown in FIG. 3B, and by reference number 310, the BMSC device may transmit the eMBMS content to the UE. The UE may receive the eMBMS content via BS 2. The BMSC device may transmit the eMBMS content to the UE by broadcasting and/or multicasting the eMBMS content via BS 2. For example, the BMSC device may transmit the eMBMS content to BS 2 via an MBMS gateway (MBMS-GW), and BS 2 may broadcast and/or multicast the eMBMS content to the UE using the second RAT.

In this way, the BMSC device may receive, via BS 1, a request for eMBMS content from a UE. Additionally or alternatively to unicasting the eMBMS content to the UE via a first RAT, the BMSC device may initiate a redirection or handover of the UE to BS 2, which may operate a second RAT that supports broadcasting and/or multicasting the eMBMS content. The BMSC device may initiate the redirection or handover by transmitting a redirection or handover request to the AMF device. The AMF device may transmit, to BS 1, a redirection request or a handover request for the UE. BS 1 may transmit a redirection command (e.g., based at least in part on receiving a redirection request) or a handover command (e.g., based at least in part on receiving a handover command) to the UE. In this way, the UE may communicatively connect with BS 2 to receive the eMBMS content via broadcast or multicast, which conserves radio resources that would have otherwise been consumed on unicasting the eMBMS content to the UE (and to a plurality of other UEs) via BS 1.

As indicated above, FIGS. 3A and 3B are provided as examples. Other examples may differ from what is described with respect to FIGS. 3A and 3B.

Figure 4:
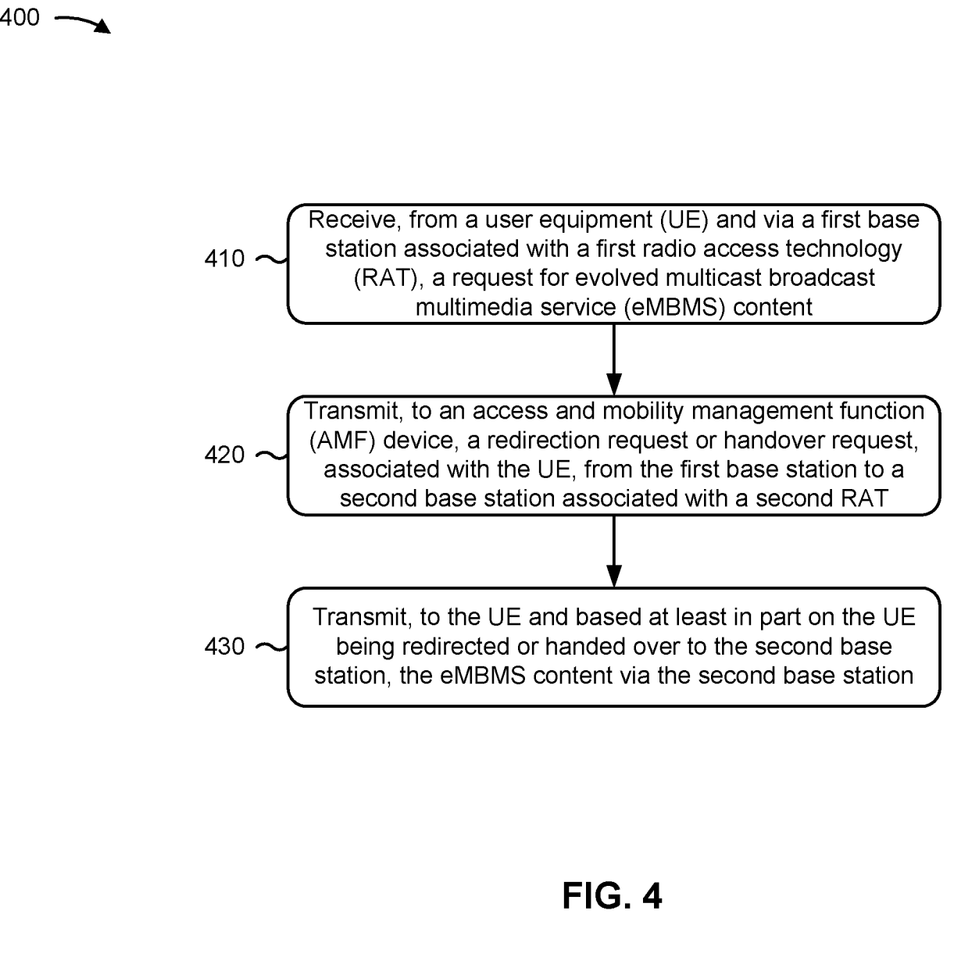
FIG. 4 is a diagram illustrating an example process performed, for example, by a broadcast multicast service center (BMSC) device, in accordance with various aspects of the present disclosure.

FIG. 4 is a diagram illustrating an example process 400 performed, for example, by a BMSC device, in accordance with various aspects of the present disclosure. Example process 400 is an example where a BMSC device (e.g., network controller 130) performs operations associated with redirection or handover for eMBMS.

As shown in FIG. 4, in some aspects, process 400 may include receiving, from a UE and via a first base station associated with a first RAT, a request for eMBMS content (block 410). For example, the BMSC device (e.g., using communication unit 294, controller/processor 290, and memory 292, and/or the like) may receive, from a UE and via a first base station associated with a first RAT, a request for eMBMS content, as described above.

As further shown in FIG. 4, in some aspects, process 400 may include transmitting, to an AMF device, a redirection request or a handover request, associated with the UE, from the first base station to a second base station associated with a second RAT (block 420). For example, the BMSC device (e.g., using communication unit 294, controller/processor 290, and memory 292, and/or the like) may transmit, to an AMF device, a redirection request or a handover request, associated with the UE, from the first base station to a second base station associated with a second RAT, as described above.

As further shown in FIG. 4, in some aspects, process 400 may include transmitting, to the UE and based at least in part on the UE being redirected or handed over to the second base station, the eMBMS content via the second base station (block 430). For example, the BMSC device (e.g., using communication unit 294, controller/processor 290, and memory 292, and/or the like) may transmit, to the UE and based at least in part on the UE being redirected or handed over to the second base station, the eMBMS content via the second base station, as described above.

Process 400 may include additional aspects, such as any single aspect or any combination of aspects described below and/or in connection with one or more other processes described elsewhere herein.

In a first aspect, the first RAT and the second RAT are different types of RATs. In a second aspect, alone or in combination with the first aspect, the first RAT comprises a 5G RAT and the second RAT comprises an LTE RAT. In a third aspect, alone or in combination with one or more of the first and second aspects, the request for the eMBMS content indicates a TMGI associated with the eMBMS content, process 400 further comprises identifying one or more frequencies, of the second RAT, associated with the eMBMS content, and the redirection request or handover request indicates the one or more frequencies. In a fourth aspect, alone or in combination with one or more of the first through third aspects, the eMBMS content is to be broadcasted to the UE via the second base station.

In a fifth aspect, alone or in combination with one or more of the first through fourth aspects, the first base station and the second base station are a same base station. In a sixth aspect, alone or in combination with one or more of the first through fifth aspects, the first base station and the second base station are different base stations.

In a seventh aspect, alone or in combination with one or more of the first through sixth aspects, the redirection request or the handover request indicates an identifier associated with the UE, and the identifier associated with the UE was indicated to the BMSC device in the request for the eMBMS content. In an eighth aspect, alone or in combination with one or more of the first through seventh aspects, the identifier associated with the UE comprises a 5G GUTI associated with the UE.

In a ninth aspect, alone or in combination with one or more of the first through eighth aspects, the first RAT and the second RAT are a same type of RAT. In a tenth aspect, alone or in combination with one or more of the first through ninth aspects, the first RAT and the second RAT each comprise a 5G RAT.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
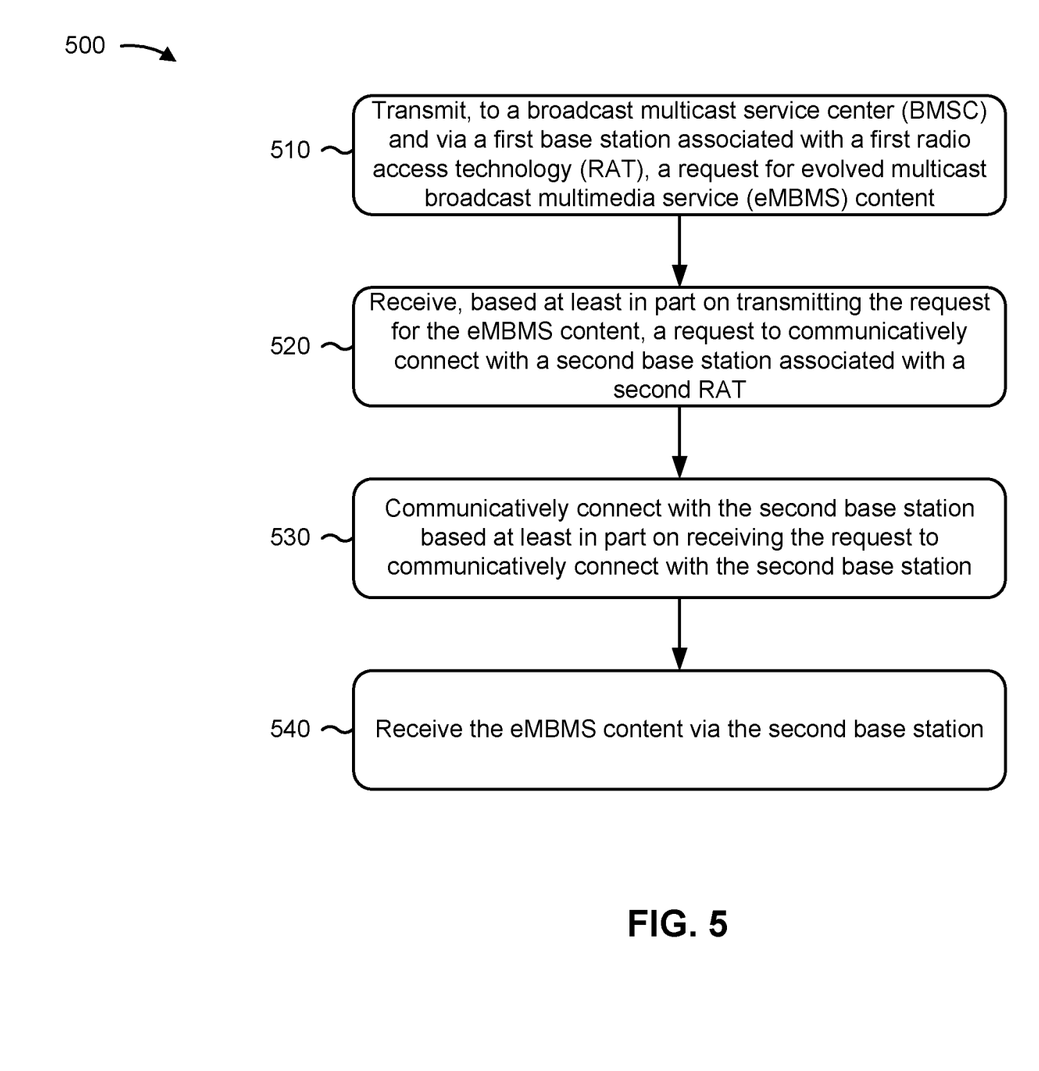
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs operations associated with redirection or handover for eMBMS.

As shown in FIG. 5, in some aspects, process 500 may include transmitting, to a BMSC and via a first base station associated with a first RAT, a request for eMBMS content (block 510). For example, the UE (e.g., using receive processor 258, transmit processor 264, controller/processor 280, memory 282, and/or the like) may transmit, to a BMSC and via a first base station associated with a first RAT, a request for eMBMS content, as described above.

As further shown in FIG. 5, in some aspects, process 500 may include receiving, based at least in part on transmitting the request for the eMBMS content, a request to communicatively connect with a second base station associated with a second RAT (block 520). For example, the UE (e.g., using receive processor 258, transmit processor 264, controller/processor 280, memory 282, and/or the like) may receive, based at least in part on transmitting the request for the eMBMS content, a request to communicatively connect with a second base station associated with a second RAT, as described above.

As further shown in FIG. 5, in some aspects, process 500 may include communicatively connecting with the second base station based at least in part on receiving the request to communicatively connect with the second base station (block 530). For example, the UE (e.g., using receive processor 258, transmit processor 264, controller/processor 280, memory 282, and/or the like) may communicatively connect with the second base station based at least in part on receiving the request to communicatively connect with the second base station, as described above.

As further shown in FIG. 5, in some aspects, process 500 may include receiving the eMBMS content via the second base station (block 540). For example, the UE (e.g., using receive processor 258, transmit processor 264, controller/processor 280, memory 282, and/or the like) may receive the eMBMS content via the second base station, as described above.

Process 500 may include additional aspects, such as any single aspect or any combination of aspects described below and/or in connection with one or more other processes described elsewhere herein.

In a first aspect, the first RAT and the second RAT are different types of RATs. In a second aspect, alone or in combination with the first aspect, the first RAT comprises a 5G RAT and the second RAT comprises an LTE RAT. In a third aspect, alone or in combination with one or more of the first and second aspects, the first base station and the second base station are a same base station. In a fourth aspect, alone or in combination with one or more of the first through third aspects, the first base station and the second base station are different base stations. In a fifth aspect, alone or in combination with one or more of the first through fourth aspects, the request to communicatively connect with the second base station associated with the second RAT comprises a release with redirection to one or more frequencies associated with the second RAT, the one or more frequencies being associated with the eMBMS content.

In a sixth aspect, alone or in combination with one or more of the first through fifth aspects, the request to communicatively connect with the second base station associated with the second RAT comprises a mobility from NR command to hand over to the second base station. In a seventh aspect, alone or in combination with one or more of the first through sixth aspects, receiving the eMBMS content via the second base station comprises receiving the eMBMS content as a broadcast from the second base station. In an eighth aspect, alone or in combination with one or more of the first through seventh aspects, the request for the eMBMS content indicates an identifier associated with the UE, and an identifier associated with the eMBMS content.

In a ninth aspect, alone or in combination with one or more of the first through eighth aspects, the identifier associated with the UE comprises a 5G GUTI associated with the UE. In a tenth aspect, alone or in combination with one or more of the first through ninth aspects, the identifier associated with the eMBMS comprises a TMGI associated with the eMBMS content. In an eleventh aspect, alone or in combination with one or more of the first through tenth aspects, the first RAT and the second RAT are a same type of RAT. In a twelfth aspect, alone or in combination with one or more of the first through eleventh aspects, the first RAT and the second RAT each comprise a 5G RAT.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a broadcast multicast service center (BMSC) device, comprising:
   receiving, by the BMSC, from a user equipment (UE) and via a first base station associated with a first radio access technology (RAT), a request for evolved multicast broadcast multimedia service (eMBMS) content;
   unicasting, by the BMSC, to the UE, and via the first RAT associated with the first base station, the eMBMS content based at least in part on receiving the request for the eMBMS content;
   transmitting, by the BMSC, to an access and mobility management function (AMF) device, and based at least in part on receiving the request for the eMBMS content, a redirection request or a handover request, associated with the UE, from the first base station to a second base station associated with a second RAT; and
   transmitting, by the BMSC, to the UE, and based at least in part on the UE being redirected or handed over to the second base station, the eMBMS content via the second RAT associated with the second base station.

2. The method of claim 1, wherein the first RAT and the second RAT are different types of RATs.

3. The method of claim 1, wherein the first RAT and the second RAT are a same type of RAT.

4. The method of claim 1, wherein the first RAT comprises:
   a fifth generation (5G) RAT; and
   wherein the second RAT comprises:
      a long term evolution (LTE) RAT.

5. The method of claim 1, wherein the first RAT and the second RAT each comprise:
   a fifth generation (5G) RAT.

6. The method of claim 1, wherein the request for the eMBMS content indicates a temporary mobile group identity (TMGI) associated with the eMBMS content;
   wherein the method further comprises:
      identifying one or more frequencies, of the second RAT, associated with the eMBMS content; and
   wherein the redirection request or handover request indicates the one or more frequencies.

7. The method of claim 1, wherein eMBMS content is to be broadcasted or multicasted to the UE via the second RAT of the second base station.

8. The method of claim 1, wherein the first base station and the second base station are a same base station.

9. The method of claim 1, wherein the first base station and the second base station are different base stations.

10. The method of claim 1, wherein the redirection request or the handover request indicates an identifier associated with the UE,
    wherein the identifier associated with the UE was indicated to the BMSC device in the request for the eMBMS content.

11. The method of claim 10, wherein the identifier associated with the UE comprises:
    a fifth generation (5G) globally unique temporary identifier (GUTI) associated with the UE.

12. A method of wireless communication performed by a user equipment (UE) device, comprising:
    transmitting, to a broadcast multicast service center (BMSC) device and via a first base station associated with a first radio access technology (RAT), a request for evolved multicast broadcast multimedia service (eMBMS) content;
    receiving, from the BMSC device and via the first RAT associated with the first base station, the eMBMS content as a unicast based at least in part on transmitting the request for the eMBMS content;
    receiving, from an access and mobility management function (AMF) device and based at least in part on transmitting the request for the eMBMS content, a request to communicatively connect with a second base station associated with a second RAT;
    communicatively connecting with the second base station based at least in part on receiving the request to communicatively connect with the second base station; and
    receiving, from the BMSC device and via the second base station, the eMBMS content based at least in part on communicatively connecting with the second RAT associated with the second base station.

13. The method of claim 12, wherein the first RAT and the second RAT are different types of RATs.

14. The method of claim 12, wherein the first RAT and the second RAT are a same type of RAT.

15. The method of claim 12, wherein the first RAT comprises:
    a fifth generation (5G) RAT; and
    wherein the second RAT comprises:
       a long term evolution (LTE) RAT.

16. The method of claim 12, wherein the first RAT and the second RAT each comprise:
    a fifth generation (5G) RAT.

17. The method of claim 12, wherein the first base station and the second base station are a same base station.

18. The method of claim 12, wherein the first base station and the second base station are different base stations.

19. The method of claim 12, wherein the request to communicatively connect with the second base station associated with the second RAT comprises:
    a release with redirection to one or more frequencies associated with the second RAT,
       wherein the one or more frequencies are associated with the eMBMS content.

20. The method of claim 12, wherein the request to communicatively connect with the second base station associated with the second RAT comprises:
    a mobility from new radio (NR) command to hand over to the second base station.

21. The method of claim 12, wherein receiving the eMBMS content via the second base station comprises:
    receiving the eMBMS content as a broadcast or a multicast from the second base station.

22. The method of claim 12, wherein the request for the eMBMS content indicates:
    an identifier associated with the UE, and
    an identifier associated with the eMBMS content.

23. The method of claim 22, wherein the identifier associated with the UE comprises:
    a fifth generation (5G) globally unique temporary identifier (GUTI) associated with the UE.

24. The method of claim 22, wherein the identifier associated with the eMBMS content comprises:
    a temporary mobile group identity (TMGI) associated with the eMBMS content.

25. A broadcast multicast service center (BMSC) device for wireless communication, comprising:
    a memory; and
    one or more processors coupled to the memory, the memory and the one or more processors configured to:

receive, from a user equipment (UE) and via a first base station associated with a first radio access technology (RAT), a request for evolved multicast broadcast multimedia service (eMBMS) content;

unicast, to the UE and via the first RAT associated with the first base station, the eMBMS content based at least in part on receiving the request for the eMBMS content;

transmit, to an access and mobility management function (AMF) device and based at least in part on receiving the request for the eMBMS content, a redirection request or a handover request, associated with the UE, from the first base station to a second base station associated with a second RAT; and transmit, to the UE and based at least in part on the UE being redirected or handed over to the second base station, the eMBMS content via the second RAT associated with the second base station.

26. The BMSC device of claim 25, wherein the first RAT and the second RAT are different types of RATs.

27. The BMSC device of claim 25, wherein the request for the eMBMS content indicates a temporary mobile group identity (TMGI) associated with the eMBMS content;

wherein the one or more processors are further configured to:
 identify one or more frequencies, of the second RAT, associated with the eMBMS content; and
 wherein the redirection request or handover request indicates the one or more frequencies.

28. A user equipment (UE) for wireless communication, comprising:
 a memory; and
 one or more processors coupled to the memory, the memory and the one or more processors configured to:

transmit, to a broadcast multicast service center (BMSC) device and via a first base station associated with a first radio access technology (RAT), a request for evolved multicast broadcast multimedia service (eMBMS) content;

receive, from the BMSC device and via the first RAT associated with the first base station, the eMBMS content as a unicast based at least in part on transmitting the request for the eMBMS content;

receive, from an access and mobility management function (AMF) device and based at least in part on transmitting the request for the eMBMS content, a request to communicatively connect with a second base station associated with a second RAT;

communicatively connect with the second base station based at least in part on receiving the request to communicatively connect with the second base station; and receive, from the BMSC device and via the second RAT associated with the second base station, the eMBMS content based at least in part on communicatively connecting with the second base station.

29. The UE of claim 28, wherein the first RAT and the second RAT are different types of RATs.

30. The UE of claim 28, wherein the request to communicatively connect with the second base station associated with the second RAT comprises:
 a release with redirection to one or more frequencies associated with the second RAT,
 wherein the one or more frequencies are associated with the eMBMS content.

* * * * *